(12) United States Patent
Robertson et al.

(10) Patent No.: US 12,197,943 B2
(45) Date of Patent: Jan. 14, 2025

(54) SYSTEM AND METHOD FOR COMPARING BEHAVIOR OF SOFTWARE COMPONENTS

(71) Applicant: JPMorgan Chase Bank, N.A., New York, NY (US)

(72) Inventors: Neil Robertson, London (GB); Sam Raddon, London (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 504 days.

(21) Appl. No.: 17/653,215

(22) Filed: Mar. 2, 2022

(65) Prior Publication Data

US 2023/0281035 A1    Sep. 7, 2023

(51) Int. Cl.
G06F 9/48 (2006.01)

(52) U.S. Cl.
CPC ................ G06F 9/4843 (2013.01)

(58) Field of Classification Search
None
See application file for complete search history.

(56) References Cited

U.S. PATENT DOCUMENTS

| | | | | |
|---|---|---|---|---|
| 8,146,000 | B1 * | 3/2012 | Boliek | G06Q 10/0633 715/965 |
| 8,935,493 | B1 | 1/2015 | Dolan et al. | |
| 11,023,101 | B2 * | 6/2021 | Chiluvuri | G06F 16/1748 |
| 12,038,824 | B2 * | 7/2024 | Mangat | G06N 3/0464 |
| 2014/0059199 | A1 * | 2/2014 | Do | G06F 11/26 709/224 |
| 2014/0289022 | A1 * | 9/2014 | Kamiya | G06Q 10/06398 705/7.42 |
| 2016/0253491 | A1 | 9/2016 | Fanton et al. | |
| 2016/0357736 | A1 | 12/2016 | Schuenzel et al. | |
| 2017/0031969 | A1 * | 2/2017 | Smits | G06F 11/3051 |
| 2018/0027006 | A1 | 1/2018 | Zimmermann et al. | |
| 2021/0073026 | A1 * | 3/2021 | Myers | G06F 11/3065 |

(Continued)

FOREIGN PATENT DOCUMENTS

IN    2021/21003612    2/2021

OTHER PUBLICATIONS

International Search Report and Written Opinion dated Jun. 27, 2022 issued in International Patent Application No. PCT/US2022/18496.

*Primary Examiner* — Hiren P Patel
(74) *Attorney, Agent, or Firm* — Greenblum & Bernstein, P.L.C.

(57) ABSTRACT

A method for performing workflow comparisons for determining data migration readiness is provided. The method includes initiating a comparison run for a batch file, and splitting the batch file into multiple component workflows. Each of the component workflows are then scheduled for processing across multiple processing stages. When a component workflow is determined to have completed all of the processing stages: compute a difference between a baseline and a target system for the component workflow, and cross reference the difference generated with prestored rules as well as machine learning techniques to determine whether the difference can be ignored (e.g., excluded) or explained (e.g., already encompassed in the book of work). When all of the component workflows originating from the batch file passes, merging reports for all of the component workflows for generating a merged report.

19 Claims, 11 Drawing Sheets

(56) References Cited

U.S. PATENT DOCUMENTS

2021/0168203 A1    6/2021  Parulkar et al.
2021/0174941 A1*  6/2021  Mathur ................ H04L 63/102
2021/0286684 A1    9/2021  Nara

* cited by examiner

200

SYSTEM AND METHOD FOR COMPARING BEHAVIOR OF SOFTWARE COMPONENTS

TECHNICAL FIELD

This disclosure generally relates to a system and method for comparing the behavior of two software components in performing a series of actions over items in a large dataset, for determining migration readiness.

BACKGROUND

The developments described in this section are known to the inventors. However, unless otherwise indicated, it should not be assumed that any of the developments described in this section qualify as prior art merely by virtue of their inclusion in this section, or that those developments are known to a person of ordinary skill in the art.

Presently, there is no framework comparing the behavior of two software components in performing a series of actions over items in a large dataset for determining software migration readiness. Based on the presently available standard batch processing, performing of necessary checks and comparisons for determining software migration readiness may require an average of one to two weeks, and may require a large amount of technical resources, including developers, processor utilization, and memory utilization due to various processing inefficiencies. Present comparison process includes executing the full sequence of sub-tasks on each item in the data set before moving onto the next data item, leading to inefficiencies caused by idle/unused processing capacity. For example, the present comparison process uses one processor to serially execute a sequence of sub-tasks (e.g., Task1, Task2, Task3, Task4) on one data item (e.g. Deal 1) included in a data set before a sequence of sub-tasks (e.g. Task1, Task2, Task3, Task4) on a subsequent data item (e.g. Deal 2).

As illustrated in FIG. 9, in conventional practice, a subtask Task 1 may be completed for Deal 1 data item, but is unable to perform Task 1 for Deal 2 until remaining subtasks Task 2, Task 3 and Task 4 for the Deal 1 data item are all completed. Accordingly, Task 1 remains idle until Task 2, Task 3, and Task 4 for Deal 1 data item are all completed, leading to longer processing times and inefficiencies. Similar delays are present for other subtasks Task 2, Task 3 and Task 4. For example, subtask Task 2 may remain idle after processing Task 2 for Deal 1 until Task 3 for Deal 1, Task 4 for Deal 1, and Task 1 for Deal 2 are all completed. For subtask Task 3, Task 3 may remain idle after processing Task 3 for Deal 1 until Task 4 for Deal 1, Task 1 for Deal 2, and Task 2 for Deal 2 are all completed. Lastly, for subtask Task 4, Task 4 may remain idle after processing Task 4 for Deal 1 until Task 1 for Deal 2, Task 2 for Deal 2, and Task 3 for Deal 2 are all completed. Accordingly, in the present example, it can be seen that more time is spent idling than processing of the subtasks leading to longer processing times and inefficient usage of resources.

Accordingly, for quicker processing and conservation of technical resources (e.g., processing efficiency, memory utilization and the like), an improved framework for performing processing of large data sets is desired.

SUMMARY

According to an aspect of the present disclosure, a method for performing workflow comparisons for determining data migration readiness is provided. The method includes performing, using a processor and a memory: initiating a comparison run for a batch file; splitting the batch file into a plurality of component workflows; scheduling each of the plurality of component workflows for processing; executing each of the plurality of component workflows through a plurality of processing stages; when a component workflow among the plurality of workflow is determined to have completed each of the plurality of processing stages: computing and storing a difference between a baseline system and a target system for the component workflow and marking the component workflow as completed until all of the plurality of component workflows have completed each of the plurality of processing stages; cross-referencing the computed difference with a plurality of stored rules, and when the computed difference matches with one of the plurality of stored rules, determining whether the difference is an explainable difference or an excludable difference; and generating a report for the completed component workflow, the generated report including at least the explainable difference when the computed difference is determined to be the explainable difference, and the generated report not including the excludable difference when the computed difference is determined to be the excludable difference; when a component workflow among the plurality of workflows is determined not to have completed each of the plurality of processing stages: modifying a status of the component workflow to retry processing at a stage where the component workflow was unable to complete processing previously; and when all of the plurality of component workflows have been processed through the plurality of processing stages, merging reports for all of the plurality of workflows for generating a merged report.

According to another aspect of the present disclosure, the computing of the differences is performed using a comparison algorithm such as a tree matching algorithm.

According to another aspect of the present disclosure, at least one of the plurality of component workflows is a comparison workflow for comparing of messaging in the baseline system against messaging in a target system.

According to yet another aspect of the present disclosure, a component workflow is caused to fail when the component workflow is unable to complete all of subtasks required for computing the differences.

According to another aspect of the present disclosure, the computed difference is analyzed using one or more artificial intelligence or machine learning algorithms for categorizing the computed difference.

According to a further aspect of the present disclosure, the completed component workflow includes metadata to indicate a presence of the computed difference, and a basis for the difference.

According to yet another aspect of the present disclosure, the merged report indicates differences between messaging in the baseline system against messaging in a target system.

According to a further aspect of the present disclosure, the excludable difference is a break that is expected, and the explainable difference is a known issue for which a fix is tasked to be implemented.

According to another aspect of the present disclosure, the executing of each of the plurality of component workflows further includes: determining a capacity limit at a processing stage of the plurality of processing stages; sending, to the processing stage, a number of component workflows among the plurality of component workflows that matches the capacity limit; contemporaneously processing the component workflows at the processing stage; monitoring a processing status at the processing stage; and when a number of component workflows being processed at the processing stage is indicated as falling below the capacity limit during the monitoring, causing another component workflow to be sent for processing at the processing stage such that the processing stage is operating at the capacity limit.

According to a further aspect of the present disclosure, at least two of the plurality of processing stages have different capacity limits.

According to a further aspect of the present disclosure, at least two of the plurality of processing stages have a same capacity limit.

According to a further aspect of the present disclosure, the component workflow to perform the retry processing is placed in a retry queue until a vacancy is available at the stage where the component workflow was unable to complete processing previously.

According to a further aspect of the present disclosure, the excludable difference is excluded before the report is generated.

According to a further aspect of the present disclosure, the generated report indicates which part of messaging in the target system is breaking and a cause for the breaking.

According to another aspect of the present disclosure, the excludable difference is excluded after the report is generated.

According to another aspect of the present disclosure, a status of the comparison run of the batch file is tracked in real time.

According to another aspect of the present disclosure, component workflows originating from the batch file are executed independently, such that processing of one component workflow does not impact processing of remaining component workflows.

According to another aspect of the present disclosure, each of the plurality of component workflows performs a comparison of messaging in the baseline system against messaging in a target system, and the merged report provides an aggregated view of which part or parts of the messaging in the target system for the batch file are causing most issues.

According to another aspect of the present disclosure, a system for performing workflow comparisons for determining data migration readiness is disclosed. The system includes at least one processor; at least one memory; and at least one communication circuit. The at least one processor is configured to: initiate a comparison run for a batch file; split the batch file into a plurality of component workflows; schedule each of the plurality of component workflows for processing; execute each of the plurality of component workflows through a plurality of processing stages; when a component workflow among the plurality of workflow is determined to have completed each of the plurality of processing stages: compute and store a difference between a baseline and a target system for the component workflow and marking the component workflow as completed until all of the plurality of component workflows have completed each of the plurality of processing stages; cross-reference the computed difference with a plurality of stored rules, and when the computed difference matches with one of the plurality of stored rules, determining whether the difference is an explainable difference or an excludable difference; and generate a report for the completed component workflow, the generated report including at least the explainable difference when the computed difference is determined to be the explainable difference, and the generated report not including the excludable difference when the computed difference is determined to be the excludable difference; when a component workflow among the plurality of workflows is determined not to have completed each of the plurality of processing stages: modify a status of the component workflow to retry processing at a stage where the component workflow was unable to complete processing previously; and when all of the plurality of component workflows have been processed through the plurality of processing stages, merge reports for all of the plurality of workflows for generating a merged report.

According to another aspect of the present disclosure, a non-transitory computer readable storage medium that stores a computer program for performing workflow comparisons for determining data migration readiness is disclosed. The computer program, when executed by a processor, causing a system to perform a process including initiating a comparison run for a batch file; splitting the batch file into a plurality of component workflows; scheduling each of the plurality of component workflows for processing; executing each of the plurality of component workflows through a plurality of processing stages; when a component workflow among the plurality of workflow is determined to have completed each of the plurality of processing stages: computing and storing a difference between a baseline and a target system for the component workflow and marking the component workflow as completed until all of the plurality of component workflows have completed each of the plurality of processing stages; cross-referencing the computed difference with a plurality of stored rules, and when the computed difference matches with one of the plurality of stored rules, determining whether the difference is an explainable difference or an excludable difference; and generating a report for the completed component workflow, the generated report including at least the explainable difference when the computed difference is determined to be the explainable difference, and the generated report not including the excludable difference when the computed difference is determined to be the excludable difference; when a component workflow among the plurality of workflows is determined not to have completed each of the plurality of processing stages: modifying a status of the component workflow to retry processing at a stage where the component workflow was unable to complete processing previously; and when all of the plurality of component workflows have been processed through the plurality of processing stages, merging reports for all of the plurality of workflows for generating a merged report.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Figure 1:
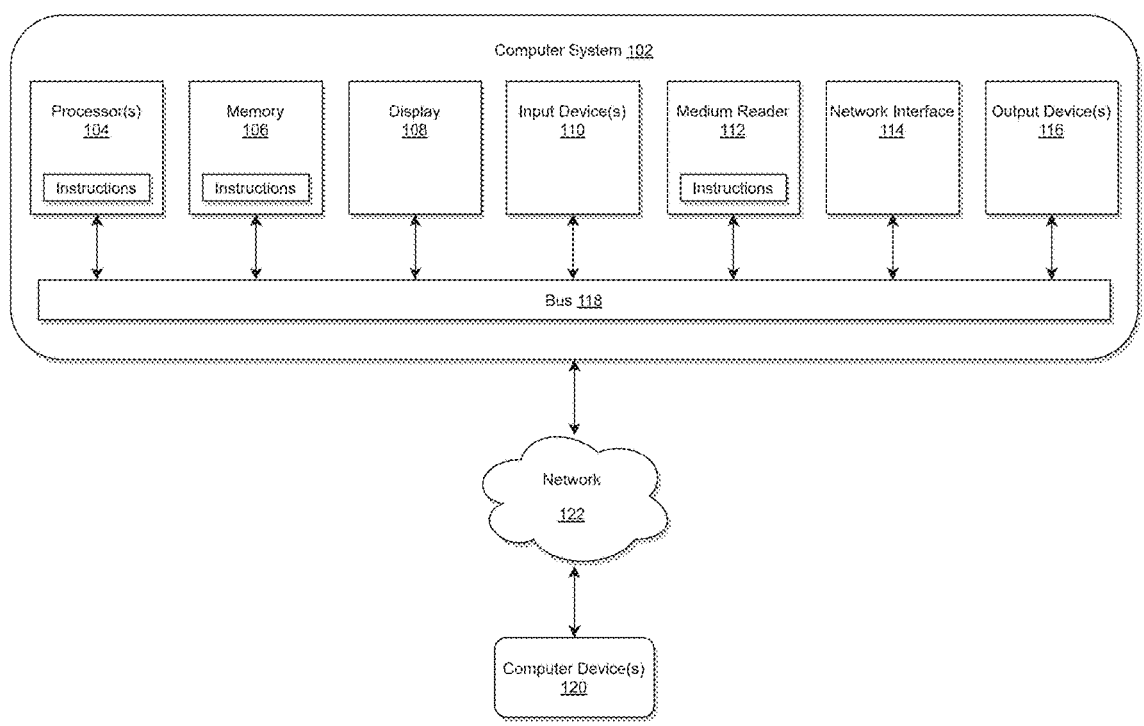
FIG. 1 illustrates a computer system for implementing a workflow comparison system in accordance with an exemplary embodiment.

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

FIG. 1 illustrates a computer system for implementing a workflow comparison system in accordance with an exemplary embodiment.

The system 100 is generally shown and may include a computer system 102, which is generally indicated. The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term system shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The network interface 114 may include, without limitation, a communication circuit, a transmitter or a receiver. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and an operation mode having parallel processing capabilities. Virtual computer system processing can be constructed to implement one or more of the methods or functionality as described herein, and a processor described herein may be used to support a virtual processing environment.

Figure 2:
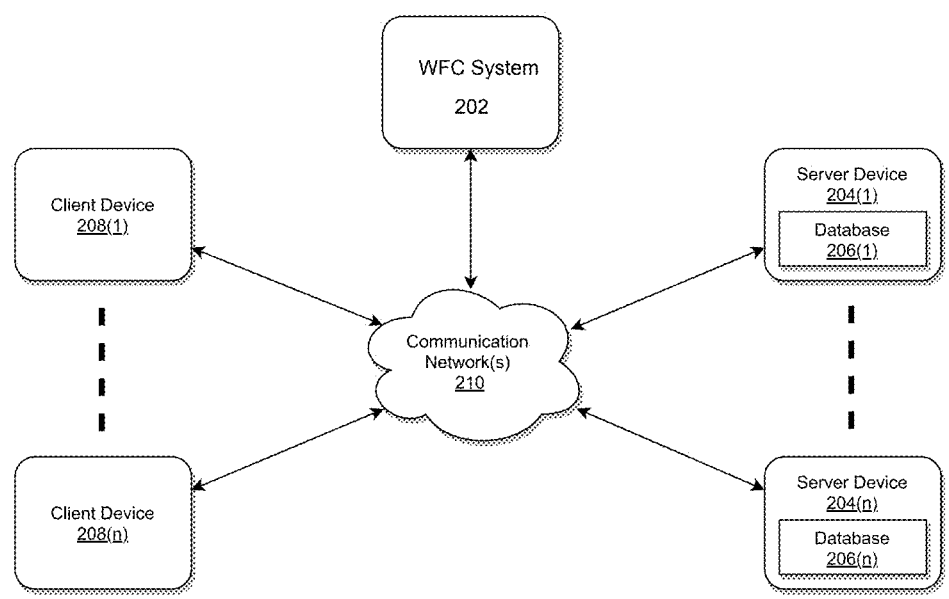
FIG. 2 illustrates an exemplary diagram of a network environment with a workflow comparison system in accordance with an exemplary embodiment.

FIG. 2 illustrates an exemplary diagram of a network environment with a workflow comparison system in accordance with an exemplary embodiment.

A workflow comparison (WFC) tool 202 may be the same or similar to the computer system 102 as described with respect to FIG. 1.

The WFC tool 202 may store one or more applications that can include executable instructions that, when executed by the WFC tool 202, cause the WFC tool 202 to perform actions, such as to execute, transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment or other networking environments. The application(s) may be executed within or as virtual machine(s) or virtual server(s) that may be managed in a cloud-based computing environment. Also, the application(s), and even the WFC tool 202 itself, may be located in virtual server(s) running in a cloud-based computing environment rather than being tied to one or more specific physical network computing devices. Also, the application(s) may be running in one or more virtual machines (VMs) executing on the WFC tool 202. Additionally, in one or more embodiments of this technology, virtual machine(s) running on the WFC tool 202 may be managed or supervised by a hypervisor.

In the network environment 200 of FIG. 2, the WFC tool 202 is coupled to a plurality of server devices 204(1)-204(n) that hosts a plurality of databases 206(1)-206(n), and also to a plurality of client devices 208(1)-208(n) via communication network(s) 210. A communication interface of the WFC tool 202, such as the network interface 114 of the computer system 102 of FIG. 1, operatively couples and communicates between the WFC tool 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the WFC tool 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The WFC tool 202 may be a standalone device or integrated with one or more other devices or apparatuses, such as one or more of the server devices 204(1)-204(n), for example. In one particular example, the WFC tool 202 may be hosted by one of the server devices 204(1)-204(n), and other arrangements are also possible. Moreover, one or more of the devices of the WFC tool 202 may be in the same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the WFC tool 202 via the communication network(s) 210 according to the HTTP-based protocol, for example, although other protocols may also be used. According to a further aspect of the present disclosure, in which the user interface may be a Hypertext Transfer Protocol (HTTP) web interface, but the disclosure is not limited thereto.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) in this example may include any type of computing device that can facilitate the implementation of the WFC tool 202 that may efficiently provide a platform for implementing a cloud native WFC module, but the disclosure is not limited thereto.

The client devices 208(1)-208(n) may run interface applications, such as standard web browsers or standalone client applications, which may provide an interface to communicate with the WFC tool 202 via the communication network(s) 210 in order to communicate user requests. The client devices 208(1)-208(n) may further include, among other features, a display device, such as a display screen or touchscreen, and/or an input device, such as a keyboard, for example.

Although the exemplary network environment 200 with the WFC tool 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the WFC tool 202, the server devices 204(1)-204(n), or the client devices 208(1)-208(n), for example, may be configured to operate as virtual instances on the same physical machine. For example, one or more of the WFC tool 202, the server devices 204(1)-204(n), or the client devices 208(1)-208(n) may operate on the same physical device rather than as separate devices communicating through communication network(s) 210. Additionally, there may be more or fewer WFC tools 202, server devices 204(1)-204(n), or client devices 208(1)-208(n) than illustrated in FIG. 2. According to exemplary embodiments, the WFC tool 202 may be configured to send code at run-time to remote server devices 204(1)-204(n), but the disclosure is not limited thereto.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
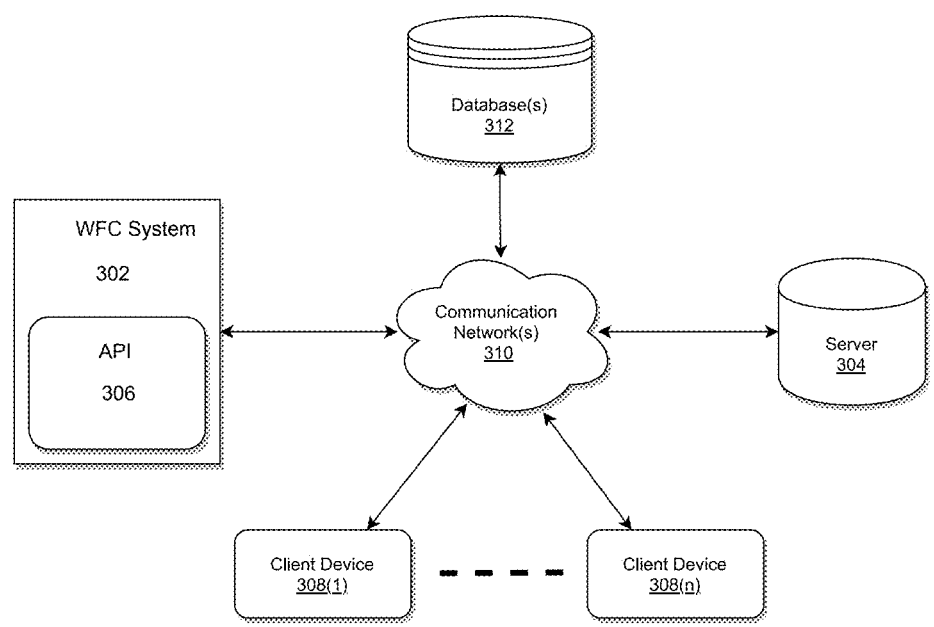
FIG. 3 illustrates a system diagram for implementing a workflow comparison system in accordance with an exemplary embodiment.

FIG. 3 illustrates a system diagram for implementing a workflow comparison system in accordance with an exemplary embodiment.

As illustrated in FIG. 3, the system 300 may include a WFC system 302 within which a group of API modules 306 is embedded, a server 304, a database(s) 312, a plurality of client devices 308(1) . . . 308(n), and a communication network 310.

According to exemplary embodiments, the WFC system 302 including the API modules 306 may be connected to the server 304, and the database(s) 312 via the communication network 310. Although there is only one database has been illustrated, the disclosure is not limited thereto. Any number of databases may be utilized. The WFC System 302 may also be connected to the plurality of client devices 308(1) . . . 308(n) via the communication network 310, but the disclosure is not limited thereto.

According to exemplary embodiment, the WFC system 302 is described and shown in FIG. 3 as including the API modules 306, although it may include other rules, policies, modules, databases, or applications, for example. According to exemplary embodiments, the database(s) 312 may be embedded within the WFC system 302. According to exemplary embodiments, the database(s) 312 may be configured to store configuration details data corresponding to a desired data to be fetched from one or more data sources, user information data etc., but the disclosure is not limited thereto.

According to exemplary embodiments, the API modules 306 may be configured to receive real-time feed of data or data at predetermined intervals from the plurality of client devices 308(1) . . . 308(n) via the communication network 310.

The API modules 306 may be configured to implement a user interface (UI) platform that is configured to enable WFC as a service for a desired data processing scheme. The UI platform may include an input interface layer and an output interface layer. The input interface layer may request preset input fields to be provided by a user in accordance with a selection of an automation template. The UI platform may receive user input, via the input interface layer, of configuration details data corresponding to a desired data to be fetched from one or more data sources. The user may specify, for example, data sources, parameters, destinations, rules, and the like. The UI platform may further fetch the desired data from said one or more data sources based on the configuration details data to be utilized for the desired data processing scheme, automatically implement a transformation algorithm on the desired data corresponding to the configuration details data and the desired data processing scheme to output a transformed data in a predefined format, and transmit, via the output interface layer, the transformed data to downstream applications or systems.

The plurality of client devices 308(1) . . . 308(n) are illustrated as being in communication with the WFC system 302. In this regard, the plurality of client devices 308(1) . . . 308(n) may be "clients" of the WFC system 302 and are described herein as such. Nevertheless, it is to be known and understood that the plurality of client devices 308(1) . . . 308(n) need not necessarily be "clients" of the WFC system 302, or any entity described in association therewith herein. Any additional or alternative relationship may exist between either or both of the plurality of client devices 308(1) . . . 308(n) and the WFC system 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, one or more of the plurality of client devices 308(1) . . . 308(n) may communicate with the WFC system 302 via broadband or cellular communication. Of course, these embodiments are merely exemplary and are not limiting or exhaustive.

The computing device 301 may be the same or similar to any one of the client devices 208(1)-208(n) as described with respect to FIG. 2, including any features or combination of features described with respect thereto. The WFC system 302 may be the same or similar to the WFC tool 202 as described with respect to FIG. 2, including any features or combination of features described with respect thereto.

Figure 4:
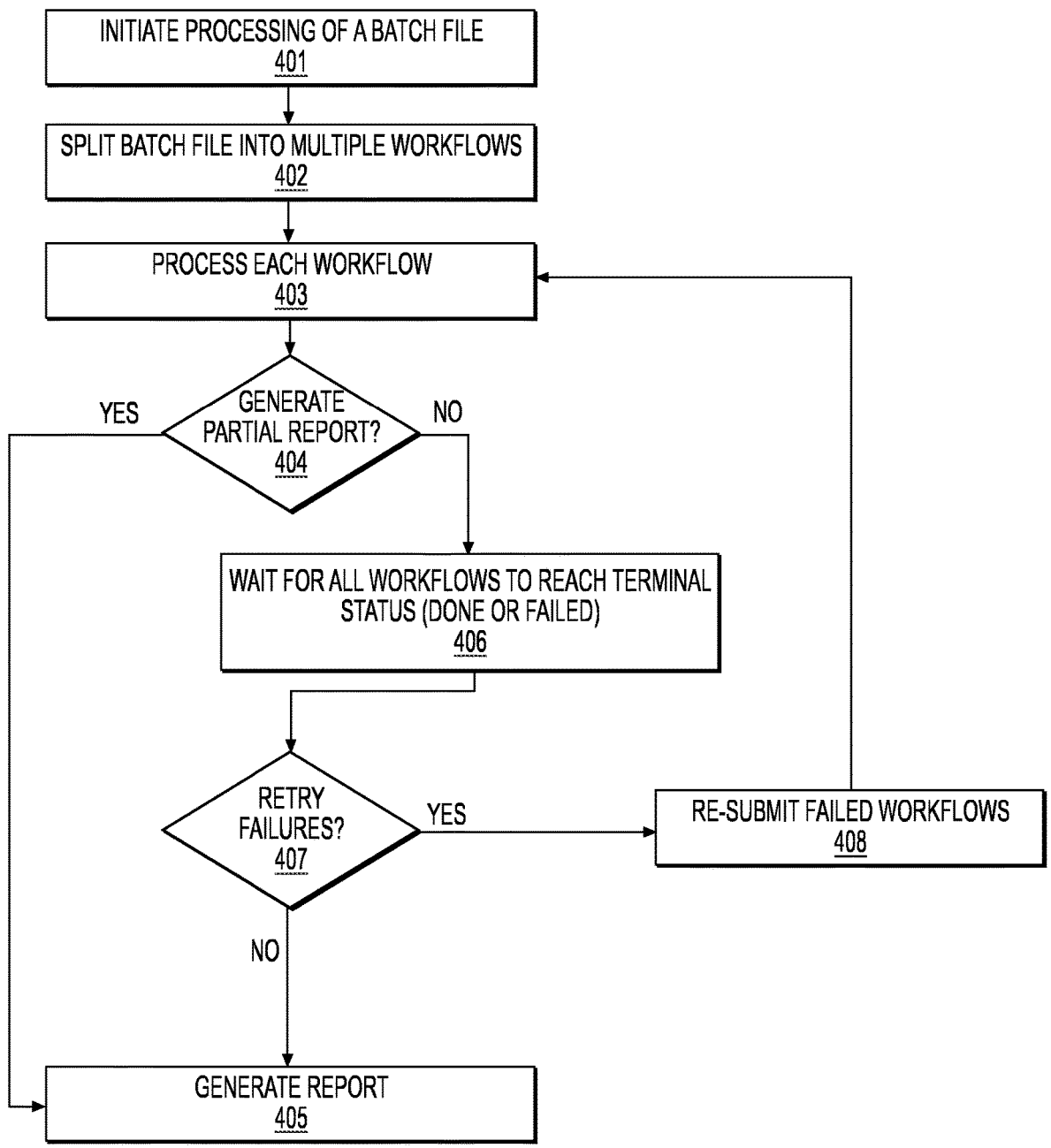
FIG. 4 illustrates a method for performing workflow comparison in accordance with an exemplary embodiment.

FIG. 4 illustrates a method for performing workflow comparison in accordance with an exemplary embodiment.

In operation 401, processing of a batch file is initiated by providing an input to a user interface of a workflow comparison (WFC) system. In an example, a batch file may include a book or a record of various positions held by a trader. Further, a batch file may include records corresponding to different categories or types of information (e.g., different deals, client, and the like), and may be stored as objects. In an example, one or more of the stored objects may correspond to a trade deal, which may be identified as a separate component workflow. According to exemplary aspects, each component workflow may include a plurality of subtasks that are to be processed at different stages, before a respective component workflow may be deemed to be successfully processed, at which a comparison check may be performed.

In operation 402, the batch file is split into multiple component workflows. In an example, the batch file may be automatically split into workflows based on a workflow identity. Further, in an example, the batch file may be split into similar sized workflows, or may be split according to one or more attributes and may be differently sized. According to exemplary aspects, one or more of the component workflows may perform a comparison processing between messages in a legacy or a baseline system and messages in a new system or a target system. One or more of the messages being compared may be a nested message, and may refer to a communication protocol between various systems.

According to exemplary aspects, each of the multiple component workflows may be scheduled for execution. In an example, execution may be a single processing stage or divided into multiple processing stages. One or more of the multiple processing stage may process a subtask of a component workflow. In the multiple processing stage framework, one or more processing stages may have a capacity limit, in which a certain number of component workflows can be executed at a time. In addition, each of the component workflow may start at the first processing stage in the multiple processing stage framework. However, aspects of the present disclosure are not limited thereto, such that certain component workflows, such as a component workflow having a subtask that was not successfully processed at a particular stage (e.g., a second stage) during multiple stage processing, may be scheduled to be executed in a later stage (e.g., the second stage where the subtask was not processed) for more efficient utilization of hardware resources expended during the comparison processing.

Further, each of the multiple component workflows may be scheduled in a first come first serve basis, based on priority, based on grouping of workflows, based on other attributes of the component workflows, and the like. Also, each of the multiple component workflows may be scheduled independent of one another, even if they originated from the same batch file.

In operation 403, each of the component workflows are processed. According to exemplary aspects, a component workflow may undergo one or more stages of processing before the comparison processing is deemed to be completed. In a multiple processing stage framework, each processing stage may simultaneously or contemporaneously process multiple component workflows up to its capacity. For example, if process stage 1 has a capacity limit of four component workflows, the processing stage 1 may take up to four component workflows for maximizing its utilization of technical resources (e.g., CPU or memory utilization) with limited downtime. If one of the component workflow is not processed at the processing stage 1, then the unprocessed component workflow may be directed be retried at a later time while other component workflows continue being processed at the processing stage 1. The processing stage 1 (now being left with three component workflows out of maximum of four), may request to process another scheduled component workflow processing to fulfill its capacity limit for maximizing utilization of the technical resources.

In each of the execution stage, a component workflow may be successfully processed or not. However, unprocessed status of a single component workflow of the batch file will be independent from other component workflows of the batch file. For example, a batch file may be divided or split into a component A workflow, a component B workflow, and a component C workflow. In such a scenario, an unprocessed status of component A workflow will not cause the component B workflow or the component C workflow to be delayed from processing. In other words, component B workflow and/or the component C workflow may continue to be processed even if component A workflow is not yet processed through a particular processing stage. This is in contrast to the old approach where, if the batch file is executed or processed as a whole without splitting into multiple component workflows, a small error in any of its included objects will cause the entire batch file to fail or stall and may require re-executing of the entire batch file once the error has been resolved or fixed.

In operation 404, a determination of whether to generate a partial report is provided. In an example, a report may be generated when a workflow reaches a terminal status (e.g., done or fail), even if other workflows have not yet reached the terminal status. If the partial report is determined to be generated in operation 404, the method proceed to operation 405.

In operation 405, a report may be generated in accordance with the received request. The receive request may indicate a request for a partial report or a full report. In an example, a partial report may be generated before all of the workflows reach a terminal status (e.g., done or fail). In contrast, a full report may be generated when all of the workflows reach the terminal status. In an example, the report may include at least one or more explainable and/or unexplainable differences detected in the comparison. Further, the report may exclude the differences that are determined to be explainable and excludable. The excludable differences may be excluded before or after generation of the report. However, aspects of the present disclosure are not limited thereto, such that the excludable differences may be noted in the report or separately obtained.

On the other hand, if the partial report is determined not to be generated after a workflow has reached a terminal status in operation 404, the method proceeds to operation 406.

In operation 406, the method waits for all of the workflows to reach the terminal status.

In operation 407, a determination to retry failures is performed. If the failed workflow(s) are determined to be retried in operation 407, the failed workflow(s) are resubmitted for processing in operation 408. Subsequently, each of the failed workflow(s) are reprocessed in operation 403.

If the failed workflow(s) are determined not to be reprocessed, a full report including the failed workflow(s) are generated in operation 405. In an example, the full report may include at least one or more explainable and/or unexplainable differences detected in the comparisons. Further, the report may exclude the differences that are determined to be explainable and excludable. The excludable differences may be excluded before or after generation of the report. However, aspects of the present disclosure are not limited thereto, such that the excludable differences may be noted in the report or separately obtained.

Moreover, one or more artificial intelligence (AI) or machine learning (ML) algorithms may be utilized to distinguish allowable/excusable/excludible errors and errors requiring a fix. Further, the AI or ML algorithms may be executed to analyze differences in completed component workflows to determine the nature of error encountered, categorize the error encountered, and/or assess whether the error requires a fix or not. In an example, AI or ML algorithms may be executed to perform data pattern detection, and to provide an output based on the data pattern detection. More specifically, an output may be provided based on a historical pattern of data, such that with more data or more recent data, more accurate outputs may be provided. Accordingly, the ML or AI models may be constantly updated after a predetermined number of runs or iterations. According to exemplary aspects, machine learning may refer to computer algorithms that may improve automatically through use of data. Machine learning algorithm may build an initial model based on sample or training data, which may be iteratively improved upon as additional data are acquired.

More specifically, machine learning/artificial intelligence and pattern recognition may include supervised learning algorithms such as, for example, k-medoids analysis, regression analysis, decision tree analysis, random forest analysis, k-nearest neighbors analysis, logistic regression analysis, 5-fold cross-validation analysis, balanced class weight analysis, and the like. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, and the like.

In another exemplary embodiment, the ML or AI model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the ML or AI model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the ML or AI models may be generated using at least one from among an artificial neural network technique, a decision tree technique, a support vector machines technique, a Bayesian network technique, and a genetic algorithms technique.

Figure 5A:
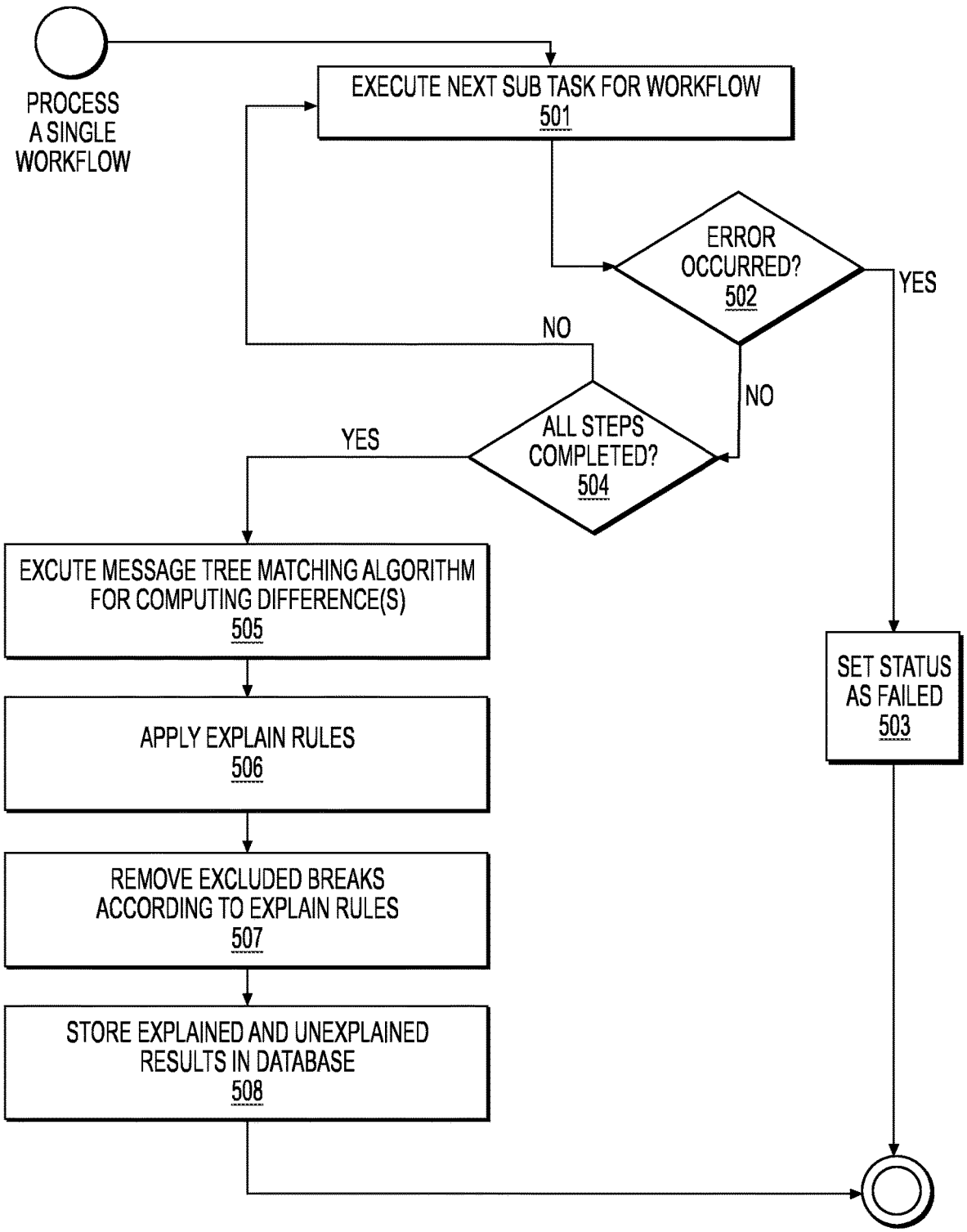
FIG. 5A illustrates a method for processing a single workflow in accordance with an exemplary embodiment.
Figure 5B:
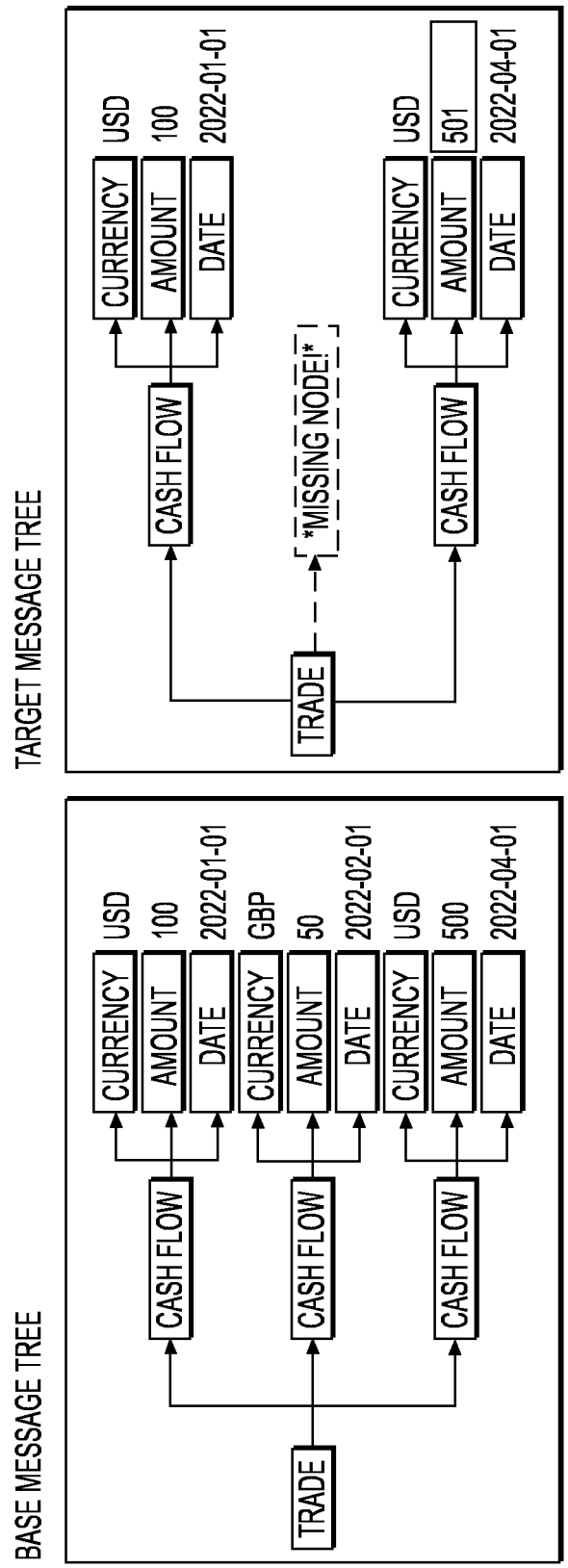
FIG. 5B illustrates results of a message tree matching algorithm in accordance with an exemplary embodiment.

FIG. 5A illustrates a method for processing a single workflow in accordance with an exemplary embodiment. FIG. 5B illustrates results of a message tree matching algorithm in accordance with an exemplary embodiment.

In operation 501, a sub-task is executed for a workflow. In an example, each workflow may include multiple sub-tasks, steps, or components, which may be separately processed. Upon execution of a sub-task of a workflow, a determination of whether an error occurred in the execution of the respective sub-task is performed in operation 502. If an error is determined to have occurred in operation 502, a status of the executed sub-task having the error is set as failed in operation 503.

If an error is determined to not have occurred in operation 502, the method proceeds to operation 504. In operation 504, it is determined whether all steps or sub-tasks of a workflow are completed. If not all of the sub-tasks have not been completed, the next sub-task of the respective workflow is executed in operation 501.

On the other hand, if all of the sub-tasks of the respective workflow have been executed, then a comparison algorithm, such as a message tree matching algorithm, is performed in operation 505 for computing differences. More specifically, if the all of the sub-tasks of a workflow is completed without error, then the workflow process is deemed to be completed and differences (or breaks) between content of a legacy/baseline system and a target system is determined using the message tree matching algorithm in operation 505. In an example, differences or breaks between the two systems may be computed using a message tree matching algorithm. According to exemplary aspects a message tree may refer to a collection of connections between nodes, where each node may represent a point of data. Although FIGS. 5A-5B are described with respect to the message tree matching algorithm, aspects of the present disclosure are not limited thereto, such that other comparison algorithms may be utilized for computing of the differences.

As an example, a message tree matching algorithm may generate the following messages by a base system (left-hand side) and a target system:

| Sample Message Generated by Base System | Sample Message Generated by Target System |
|---|---|
| <trade><br>  <cashflow><br>    <currency>USD</currency><br>    <amount>100</amount><br>    <date>2021-01-01</date><br>  </cashflow><br>  <cashflow><br>    <currency>GBP</currency><br>    <amount>50</amount><br>    <date>2021-02-01</date><br>  </cashflow><br>  <cashflow><br>    <currency>USD</currency><br>    <amount>500</amount><br>    <date>2021-04-01</date><br>  </cashflow><br></trade> | <trade><br>  <cashflow><br>    <currency>USD</currency><br>    <amount>100</amount><br>    <date>2021-01-01</date><br>  </cashflow><br>  <cashflow><br>    <currency>USD</currency><br>    <amount>501</amount><br>    <date>2021-04-01</date><br>  </cashflow><br></trade> |

Based on the above noted messages, the tree matching algorithm may detect the following differences:

| Break Path | Value in Base Message | Value in Target Message |
|---|---|---|
| /trade/cashflow[GBP\|2021-02-01] | Present | Missing node! |
| /trade/cashflow[USD\|2021-04-01]/amount | 500 | 501 |

Such differences in messages may be illustrated by comparisons of the message trees generated as provided in FIG. 5B.

As illustrated in FIG. 5B, it can be seen that Cash Flow node is missing in the target message tree, even though it is present in the base message tree. Further, it can be shown that amount of 500 is shown in the amount node of the base message tree, but an amount of 501 is shown in the amount node of the target message tree.

The computed difference or differences are then cross referenced with one or more prestored explain rules to determine whether the computed difference(s) or break(s) matches with the one or more stored explain rules in operation 506. If the computed difference(s) or breaks(s) match with the prestored explain rules, then such computed difference(s) or breaks(s) are removed in operation 507. Accordingly, if a computed difference matches with a prestored explain rule, then such difference may be excluded from, or separately identified in, a generated report as not requiring further investigation.

For example, if the computed difference or differences are expected differences between the two systems, then the computed difference or differences are deemed to be expected or explainable differences, which are to be excluded from a report. In other words, such differences may not be considered breaks or errors.

Further, if the computed difference corresponds to an already known issue that has been logged and planned for a fix, such computed difference may also be considered as an explainable difference for which a fix is already planned to be implemented.

In operation 508, explained and unexplained breaks are stored in a database. In an example, when generating a report, the breaks may be reported according to whether the break(s) or difference(s) may be explainable or not. For example, explainable breaks may be provided separately from the unexplainable breaks. Alternatively, only the unexplainable breaks may be included in a report. However, aspects of the present disclosure are not limited thereto, such that a user may specify the types of breaks (e.g., explainable or unexplainable) desired to be seen in the generated report.

Figure 6:
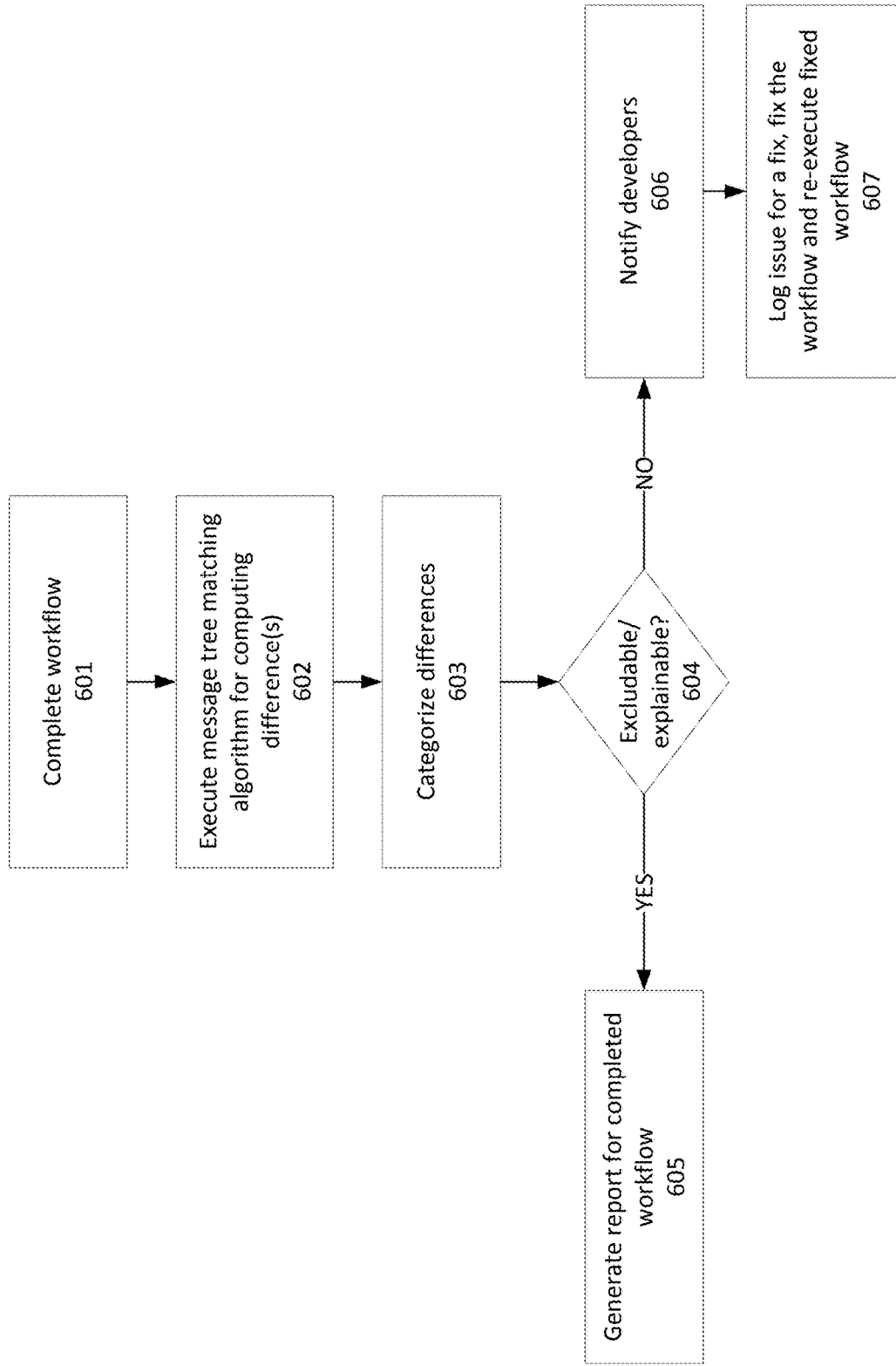
FIG. 6 illustrates a method for handling an unprocessed software component in accordance with an exemplary embodiment.

FIG. 6 illustrates a method for handling an unprocessed software component in accordance with an exemplary embodiment.

In operation 601, a component workflow originating from a batch file is determined to be completed.

In operation 602, a comparison algorithm, such as a message tree matching algorithm, is executed to compute differences in content of messages between a legacy/baseline system and a new/target system. For example, the message tree matching algorithm may analyze differences between contents of a message in a legacy/baseline system and a message in a new system to be migrated. Further, the message tree matching algorithm may analyze a message path to determine which parts of the message path are different between the two systems and for what reason.

In operation 603, the detected differences may be categorized based on its attributes and/or in view of prestored rules. In an example, the detected break or error may be categorized using one or more AI or ML algorithms. According to exemplary aspects, breaks or errors may be categorized based on severity of difference, type of difference, frequency of difference, priority of the component workflow, and the like. In an example, based on the automated categorization of differences, certain differences may be determined to be little or no consequence, and the component workflow including such differences may be deemed to be passed as a whole, which does not require a fix or further review. The passed component workflow with the negligible or explainable differences may be marked with respective metadata for reporting.

In operation 604, whether the computed differences are excludable or explainable is determined. In an example, such determination may be automated based on the results of the message tree matching algorithm in operation 602 and/or categorization of differences in operation 603. However, aspects of the present disclosure are not limited thereto, such that the reports of results of the message tree matching algorithm in operation 602 and/or categorization of differences in operation 603 may be sent to a stakeholder for approval.

If the detected difference is determined to be excludable or explainable, the differences are excluded from a report and a completion of execution process for the component workflow may be reported in operation 605. In an example, a report may be generated for each component workflow. The generated report may indicate a status of comparison processing, such as number of stages successfully executed in a multiple processing stage framework, nature of difference detected, stage in which the difference was detected, severity of the difference, and the like.

On the other hand, if the difference is determined not to be excludable/explainable in operation 604, then the method proceeds to operation 606 for notifying engineers/developers of the detected difference in the component workflow. In an example, the responsible engineers/developers may be notified to further investigate the reasons for the unexplainable difference detected and/or for performing a fix.

In operation 607, a developer or engineer may fix the component workflow for the detected difference and schedule the fixed component workflow to be reprocessed. In an example, the fixed component workflow may be schedule to be processed again starting from the first stage in a multiple processing stage framework. Further, the fixed component workflow may be inserted in the existing queue of component workflows to be executed, or may be placed behind or ahead of the existing queue of component workflows to be executed. Such determination may be made based on a priority of the respective component workflow. For example, if all of the component workflows of a batch file have been completed except for the fixed component workflow, the fixed component workflow may be scheduled to be processed immediately.

Figure 7:
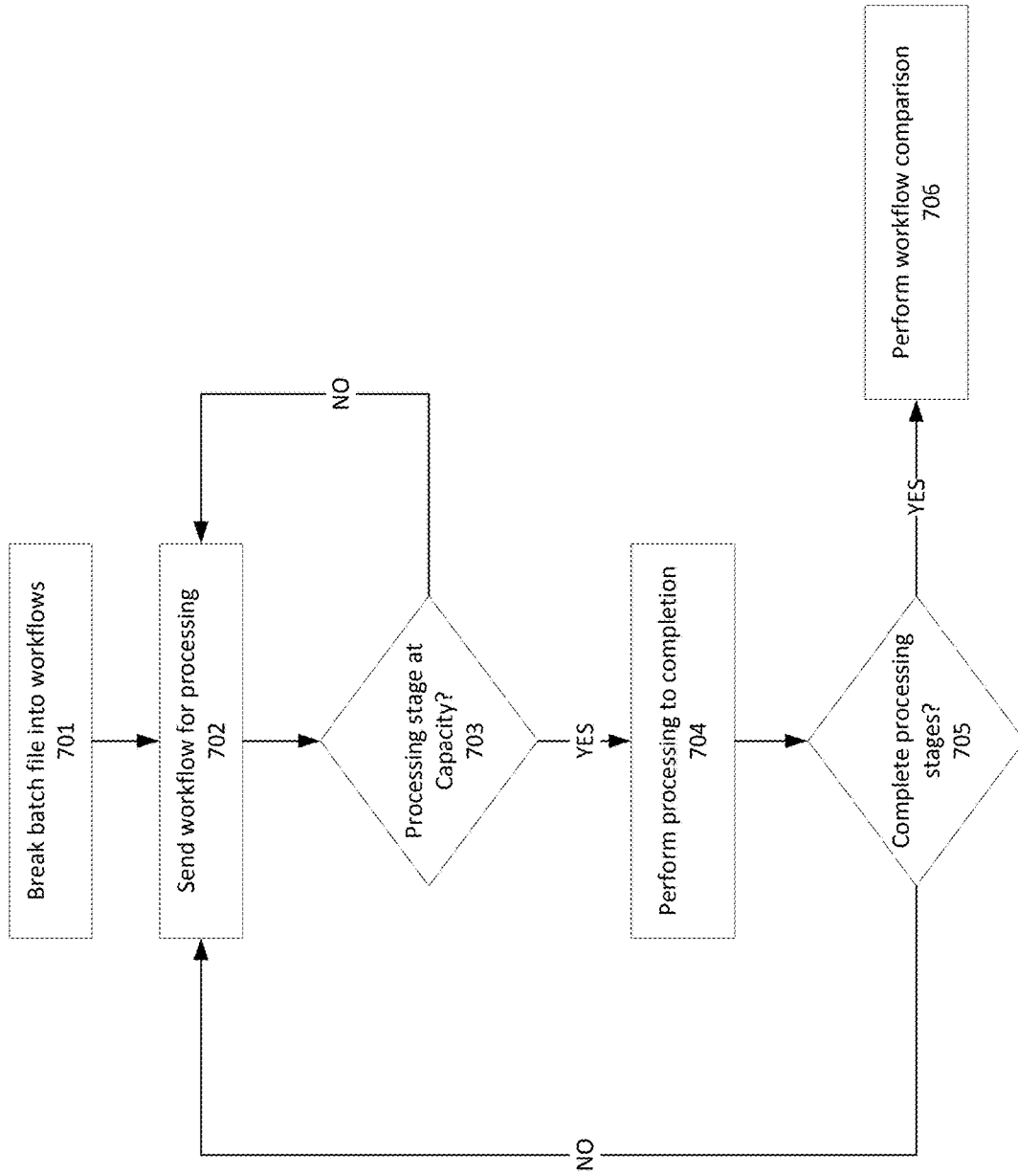
FIG. 7 illustrates a method for maximizing processing capacity of a workflow comparison system in accordance with an exemplary embodiment.

FIG. 7 illustrates a method for maximizing processing capacity of a workflow comparison system in accordance with an exemplary embodiment.

In operation 701, a batch file is broken into multiple component workflows, for performing comparisons between the component workflows in a legacy/baseline system and a new system to be migrated. In an example, a batch file may refer to a book or a record of all positions held by a trader. According to exemplary aspects of the present disclosure, the batch file may be automatically split or broken into workflows based on a workflow identity. In an example, the batch file may be split into similar sized workflows, or may be split according to one or more attributes and may be differently sized.

In operation 702, each of the component workflows are sent for execution of comparison processing. In an example, the comparison processing may include comparison of message passes or contents of messaging performed in the legacy/baseline system against contents of messaging performed in the new system to be migrated. According to exemplary aspects, the comparison processing may be a single processing stage or include multiple processing stages.

In the multiple processing stage framework, a component workflow will be processed through each one of the stages of processing before a comparison is performed for the completed component workflow. When all of the stages of processing have been successfully processed (with or without requiring retries), a component workflow is deemed to be successfully completed for computing differences between content of messaging in the legacy/baseline and new/target system. In an example, stages of processing may include, without limitation, a preparation stage, an execution stage, a reporting stage, a merging stage and the like.

Moreover, each of the stages in the multiple stage framework may have a capacity limit. For example, one stage may have the capacity to process up to five component workflows at any given moment. Each of the stages may have a same capacity or different capacity.

In operation 703, whether a processing stage is being utilized at a preset or a capacity limit is determined. In an example, the preset limit may be same or different from the capacity limit. Such determination of operation 703 may be performed for each of the stages in the multiple processing stage framework. The determination of operation 703 may be performed at the beginning of and during processing at the respective stage. If it is determined that the respective stage of processing is being performed at the preset limit, the processing continues to completion in operation 704.

On the other hand, if it is determined that the respective stage of processing is not being performed at the preset limit, additional component workflow is sent for processing in operation 702. For example, if the first stage of processing has a preset limit of performing five component workflows and one of the component workflow is either finished early or unable to be completed, the number of component workflows being processed at the first stage is reduced to four. In such a case, another component workflow will be sent for processing to the first stage of processing to maximize utility of the first processing stage and to reduce down times. Based on such operation, technical resources (e.g., CPU, memory and the like) may be more efficiently utilized.

In operation 705, a determination as to whether a component workflow has been processed through all of the processing stages is performed. If the component workflow is deemed to have been processed through all of the processing stages, the method proceeds to operation 706 for performing workflow comparison for computing differences between messaging of the legacy/baseline system and the new/target system. The computed differences may be further analyzed, either by a person or a machine algorithm to determine whether the computed differences are explainable or justifiable.

On the other hand, if the component workflow did not complete all of the processing stages (i.e., unable to complete one of the processing stages), then the respective component workflow will be sent to a retry queue to be reprocessed at the last executed processing stage in operation 706.

Figure 8:
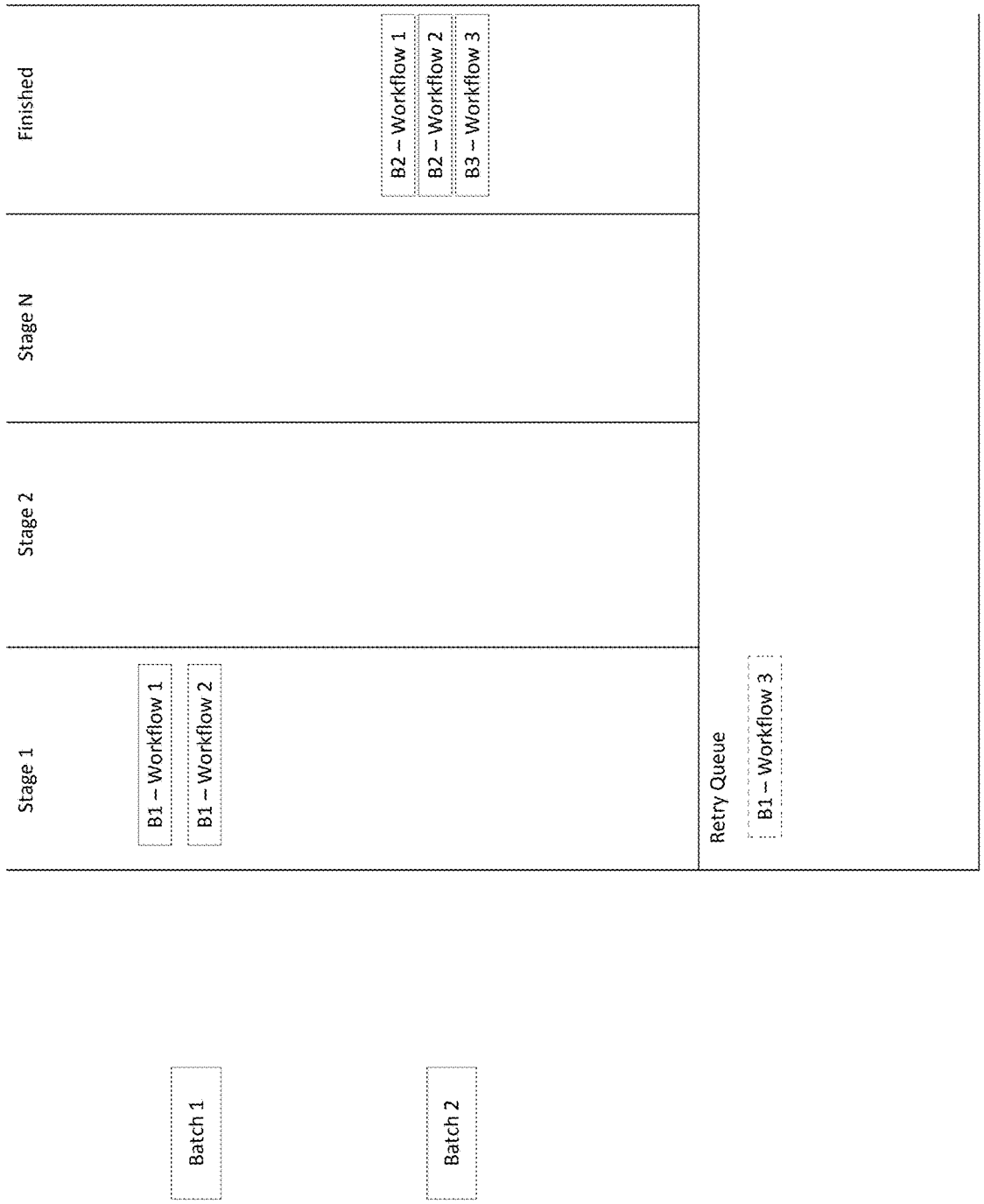
FIG. 8 illustrates a method for performing piecemeal processing of a batch file in accordance with an exemplary embodiment.

FIG. 8 illustrates a method for performing piecemeal processing of a batch file in accordance with an exemplary embodiment.

As illustrated in FIG. 8, Batch file 1 has been split into three separate component workflows, namely, B1-Workflow 1, B1-Workflow 2, and B1-Workflow 3. Likewise, Batch file 2 has been split into three separate component workflows, namely, B2-Workflow 1, B2-Workflow 2, and B2-Workflow 3. Although each of batch files, Batch file 1 and Batch file 2, is illustrated as being split into three component workflows, aspects of the present disclosure are not limited thereto, such that each of the batch files may be split into different number of component workflows and different from each batch file.

Further, multiple batch files may be executed contemporaneously or sequentially. Also, the component workflows from different batch files may be intermixed for execution processing, to allow for more flexible piecemeal execution processing. For example, B1-Workflow 1 may be processed together with B2-Workflow 2.

Also illustrated in FIG. 8, the comparison processing may be split into multiple processing stages, namely, Stage 1, Stage 2 and up to Stage N, where N is an integer. Although at least three stages of execution processing are illustrated in FIG. 8, aspects of the present disclosure are not limited thereto, such that number of processing stages may be less or more than three. Further, in an example, each of the processing stages may have certain capacity constraints. For example, Stage 1 may have a capacity to perform processing of up to four component workflows. Although Stage 1 illustrates processing only two component workflows for illustrative purposes, aspects of the disclosure are not limited thereto, such that any time that a processing stage is being utilized below its capacity, another component workflow may be added thereto for more effective utilization of technical resources.

If a component workflow is unable to be processed through in any of the processing stages, the respective component workflow may be directed to a retry queue, so that the respective component workflow may be retried at the processing stage where the component workflow was not processed through. In an example, a number of retries may be performed for a predetermined number of times for each processing stage. However, aspects of the present disclosure are not limited thereto, such that retries may be attempted until indicated otherwise by a user or until a respective processing stage is completed. In an example, the component workflow in the retry queue may be sent back to perform execution processing from the beginning (e.g., Stage 1) or to the stage where the component workflow was unable to be processed through (e.g., Stage 2).

Upon completion, each of the successfully processed component workflow may be placed in the Finished stage and marked as being completed. In an example, a report may be generated for each of the successfully processed component workflows and differences between message content of a legacy/baseline system and a target system may be computed. Further, the processed component workflows and/or corresponding reports may be grouped based on the originating batch file. Reports of the respective workflows may then be merged in an aggregate form, or in accordance with the originating batch files. Also, the processed component workflows may also be merged according to respective originating batch files.

Figure 10:
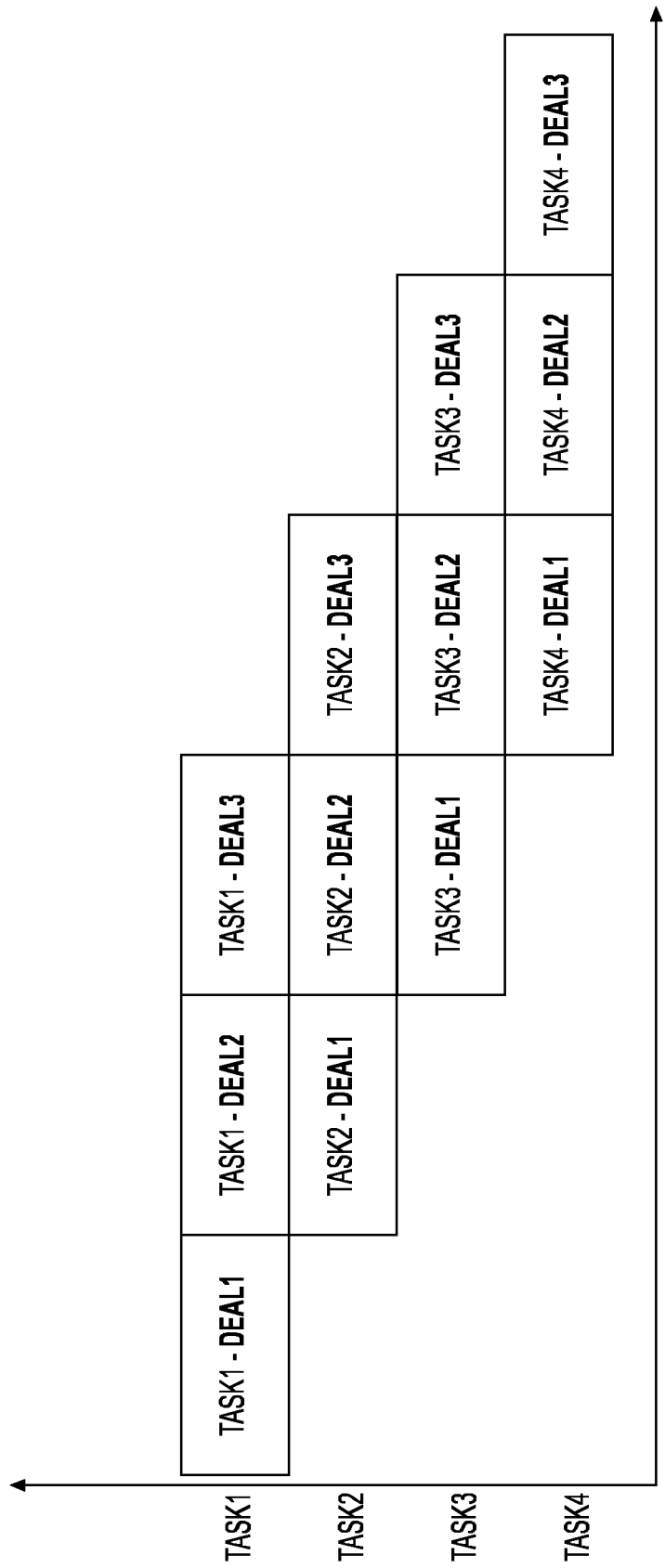
FIG. 10 illustrates an operational performance of a workflow comparison in accordance with an exemplary embodiment.

FIG. 10 illustrates a method for performing workflow comparison in accordance with an exemplary embodiment.

As illustrated in FIG. 10, each of the subtasks of a data item or workflow are processed independent of one another, such that one subtask of a target data item does not have to wait for other subtasks of the target data item to be completed before processing another subtask of another data item. More specifically, the subtask Task 1, upon completion of processing of Task 1 for Deal 1, may begin processing Task 1 for Deal 2 without first waiting for remaining subtasks for Deal 1 (i.e., Task 2, Task 3 and Task 4) to be completed. Accordingly, little or no idle time may be present between processing of subtasks for different data items or workflows.

Figure 9:
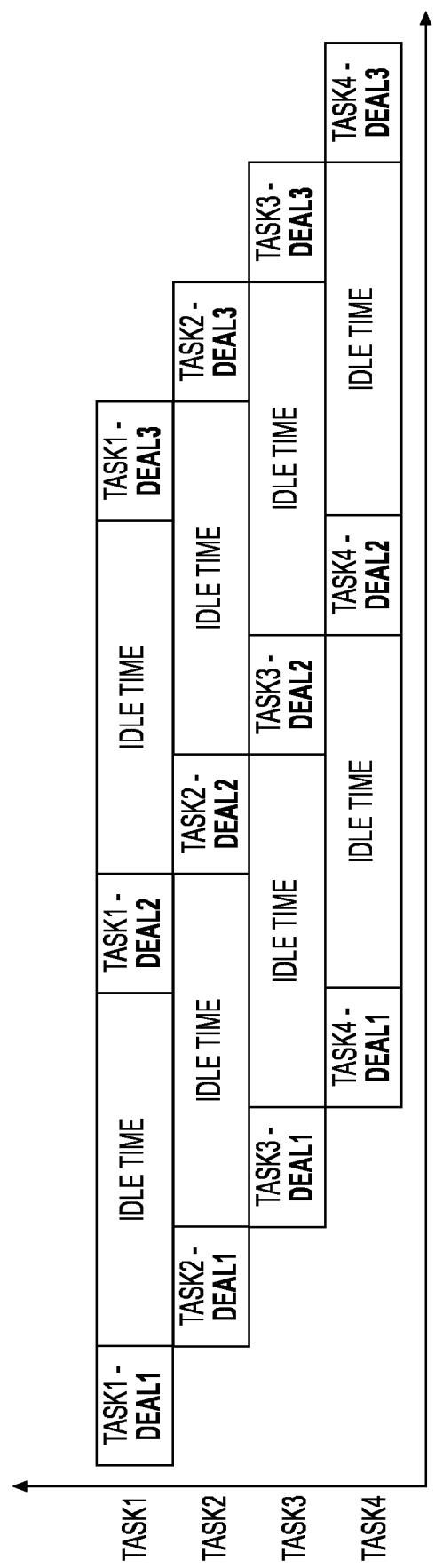
FIG. 9 illustrates a conventional operational performance of a workflow comparison.

In contrast, in the conventional practice illustrated in FIG. 9, a subtask Task 1 may be unable to perform Task 1 for Deal 2 after completing Task 1 for Deal 1, until remaining subtasks Task 2, Task 3 and Task 4 for the Deal 1 are all completed. Accordingly, the workflow comparison processing exemplarily illustrated in FIG. 10 may lead to shorter processing times and higher efficiency of technical resources.

Further, although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for performing workflow comparisons for determining data migration readiness, the method comprising:

performing, using a processor and a memory:

initiating a comparison run for a batch file;

splitting the batch file into a plurality of component workflows;
scheduling each of the plurality of component workflows for processing;
executing each of the plurality of component workflows through a plurality of processing stages;
when a component workflow among the plurality of workflow is determined to have completed each of the plurality of processing stages:
  computing and storing a difference between a baseline system and a target system for the component workflow and marking the component workflow as completed until all of the plurality of component workflows have completed each of the plurality of processing stages;
  cross-referencing the computed difference with a plurality of stored rules, and when the computed difference matches with one of the plurality of stored rules, determining whether the difference is an explainable difference or an excludable difference; and
  generating a report for the completed component workflow, the generated report including at least the explainable difference when the computed difference is determined to be the explainable difference, and the generated report not including the excludable difference when the computed difference is determined to be the excludable difference;
when a component workflow among the plurality of workflows is determined not to have completed each of the plurality of processing stages:
  modifying a status of the component workflow to retry processing at a stage where the component workflow was unable to complete processing previously; and
when all of the plurality of component workflows have been processed through the plurality of processing stages, merging reports for all of the plurality of workflows for generating a merged report,
wherein the excludable difference is a break that is expected, and the explainable difference is a known issue for which a fix is tasked to be implemented, and
wherein component workflows originating from the batch file are executed independently.

2. The method according to claim 1, wherein the computing of the differences is performed using a comparison algorithm such as a tree matching algorithm.

3. The method according to claim 1, wherein at least one of the plurality of component workflows is a comparison workflow for comparing of messaging in the baseline system against messaging in a target system.

4. The method according to claim 1, wherein a component workflow is caused to fail when the component workflow is unable to complete all of subtasks required for computing the differences.

5. The method according to claim 1, wherein the computed difference is analyzed using one or more artificial intelligence or machine learning algorithms for categorizing the computed difference.

6. The method according to claim 1, wherein the completed component workflow includes metadata to indicate a presence of the computed difference, and a basis for the difference.

7. The method according to claim 1, wherein the merged report indicates differences between messaging in the baseline system against messaging in a target system.

8. The method according to claim 1, wherein the executing of each of the plurality of component workflows further includes:
  determining a capacity limit at a processing stage of the plurality of processing stages;
  sending, to the processing stage, a number of component workflows among the plurality of component workflows that matches the capacity limit;
  contemporaneously processing the component workflows at the processing stage;
  monitoring a processing status at the processing stage; and
  when a number of component workflows being processed at the processing stage is indicated as falling below the capacity limit during the monitoring, causing another component workflow to be sent for processing at the processing stage such that the processing stage is operating at the capacity limit.

9. The method according to claim 8, wherein at least two of the plurality of processing stages have different capacity limits.

10. The method according to claim 8, wherein at least two of the plurality of processing stages have a same capacity limit.

11. The method according to claim 1, wherein the component workflow to perform the retry processing is placed in a retry queue until a vacancy is available at the stage where the component workflow was unable to complete processing previously.

12. The method according to claim 1, wherein the excludable difference is excluded before the report is generated.

13. The method according to claim 1, wherein the excludable difference is excluded after the report is generated.

14. The method according to claim 1, wherein the generated report indicates which part of messaging in the target system is breaking and a cause for the breaking.

15. The method according to claim 1, wherein a status of the comparison run of the batch file is tracked in real time.

16. The method according to claim 1, wherein processing of one component workflow does not impact processing of remaining component workflows.

17. The method according to claim 1, wherein each of the plurality of component workflows performs a comparison of messaging in the baseline system against messaging in a target system, and
  the merged report provides an aggregated view of which part or parts of the messaging in the target system for the batch file are causing most issues.

18. A system for performing workflow comparisons for determining data migration readiness, the system comprising:
  at least one processor;
  at least one memory; and
  at least one communication circuit,
  wherein the at least one processor is configured to:
  initiate a comparison run for a batch file;
  split the batch file into a plurality of component workflows;
  schedule each of the plurality of component workflows for processing;
  execute each of the plurality of component workflows through a plurality of processing stages;
  when a component workflow among the plurality of workflow is determined to have completed each of the plurality of processing stages:
    compute and store a difference between a baseline and a target system for the component workflow and marking the component workflow as completed until all of the plurality of component workflows have completed each of the plurality of processing stages;

cross-reference the computed difference with a plurality of stored rules, and when the computed difference matches with one of the plurality of stored rules, determining whether the difference is an explainable difference or an excludable difference; and generate a report for the completed component workflow, the generated report including at least the explainable difference when the computed difference is determined to be the explainable difference, and the generated report not including the excludable difference when the computed difference is determined to be the excludable difference;

when a component workflow among the plurality of workflows is determined not to have completed each of the plurality of processing stages:

modify a status of the component workflow to retry processing at a stage where the component workflow was unable to complete processing previously; and when all of the plurality of component workflows have been processed through the plurality of processing stages, merge reports for all of the plurality of workflows for generating a merged report, wherein the excludable difference is a break that is expected, and the explainable difference is a known issue for which a fix is tasked to be implemented, and wherein component workflows originating from the batch file are executed independently.

19. A non-transitory computer readable storage medium that stores a computer program for performing workflow comparisons for determining data migration readiness, the computer program, when executed by a processor, causing a system to perform a process comprising:

initiating a comparison run for a batch file;

splitting the batch file into a plurality of component workflows;

scheduling each of the plurality of component workflows for processing;

executing each of the plurality of component workflows through a plurality of processing stages;

when a component workflow among the plurality of workflow is determined to have completed each of the plurality of processing stages:

computing and storing a difference between a baseline and a target system for the component workflow and marking the component workflow as completed until all of the plurality of component workflows have completed each of the plurality of processing stages;

cross-referencing the computed difference with a plurality of stored rules, and when the computed difference matches with one of the plurality of stored rules, determining whether the difference is an explainable difference or an excludable difference; and generating a report for the completed component workflow, the generated report including at least the explainable difference when the computed difference is determined to be the explainable difference, and the generated report not including the excludable difference when the computed difference is determined to be the excludable difference;

when a component workflow among the plurality of workflows is determined not to have completed each of the plurality of processing stages:

modifying a status of the component workflow to retry processing at a stage where the component workflow was unable to complete processing previously; and when all of the plurality of component workflows have been processed through the plurality of processing stages, merging reports for all of the plurality of workflows for generating a merged report, wherein the excludable difference is a break that is expected, and the explainable difference is a known issue for which a fix is tasked to be implemented, and wherein component workflows originating from the batch file are executed independently.

\* \* \* \* \*